United States Patent [19]

Walker

[11] Patent Number: 4,834,876
[45] Date of Patent: May 30, 1989

[54] FILTRATION ASSEMBLY HAVING INTEGRAL HEATING MEANS FOR MAINTAINING THE METALLIC MATERIAL BEING FILTERED IN THE MOLTEN STATE

[76] Inventor: Nicholas G. Walker, 692 Mimosa Tree La., West Chester, Pa. 19380

[21] Appl. No.: 167,882

[22] Filed: Mar. 14, 1988

[51] Int. Cl.⁴ .............................................. B01D 35/18
[52] U.S. Cl. .................... 210/185; 210/184; 210/506; 210/510.1; 210/773
[58] Field of Search ................. 210/184–186, 210/506, 510.1; 219/6.5; 427/45.1, 50, 132, 217, 250, 252; 428/936, 938

[56] References Cited

U.S. PATENT DOCUMENTS

| | | | |
|---|---|---|---|
| Re. 24,463 | 4/1958 | Williamson | 219/6.5 X |
| 1,893,330 | 1/1933 | Jones | 210/185 X |
| 2,450,339 | 9/1948 | Hensel | 210/510.1 X |
| 2,601,616 | 6/1952 | Kasten | 210/185 X |
| 2,729,338 | 1/1956 | Heigl | 210/186 X |
| 2,863,558 | 12/1958 | Brondyke et al. | 210/186 X |
| 3,337,054 | 8/1967 | Sauer | 210/186 X |
| 3,497,389 | 2/1970 | Berger et al. | 210/510.1 X |
| 3,655,430 | 4/1972 | Greaves | 428/938 X |
| 3,951,612 | 4/1976 | Gates et al. | 428/938 X |
| 3,961,098 | 6/1976 | Bessen | 428/938 X |
| 4,081,371 | 3/1978 | Yarwood et al. | 210/510.1 X |
| 4,154,689 | 5/1979 | Yarwood et al. | 210/510.1 X |
| 4,279,748 | 7/1981 | Inoue | 210/510.1 X |
| 4,334,990 | 6/1982 | du Manoir de Juaye et al. | 210/186 |
| 4,504,392 | 3/1985 | Groteke | 210/510.1 X |
| 4,600,609 | 7/1986 | Leever et al. | 428/936 X |
| 4,690,763 | 9/1987 | Rieger et al. | 210/510.1 X |
| 4,708,740 | 11/1987 | Tungatt et al. | 210/510.1 X |

FOREIGN PATENT DOCUMENTS

| | | | |
|---|---|---|---|
| 72769 | 2/1983 | European Pat. Off. | 219/6.5 |
| 1097590 | 1/1961 | Fed. Rep. of Germany | 219/6.5 |
| 2721607 | 11/1978 | Fed. Rep. of Germany | 210/185 |
| 223038 | 5/1985 | Fed. Rep. of Germany | 219/6.5 |
| 2251351 | 7/1975 | France | 210/506 |
| 2108154 | 5/1983 | United Kingdom | 210/506 |

*Primary Examiner*—Robert Spitzer
*Attorney, Agent, or Firm*—Louis Weinstein

[57] ABSTRACT

The filtration of molten metal is obtained by providing the filtration medium, which may, for example, be formed of a granulated material, with a conductive coating or conductive particles. Electrical energy is coupled across the filter to create a current flow through the conductive material. The magnitude of the current generates heat of a level sufficient to maintain the metallic material being filtered in the molten state as it passes through the filter medium. The granules may be covered with a conductive coating or conductive particles. In an alternative embodiment, the granules may be formed of a material, such as silicon carbide, which is capable of being inductively heating to maintain the metallic material being filtered in the molten state as it is passed through the filter medium.

12 Claims, 3 Drawing Sheets

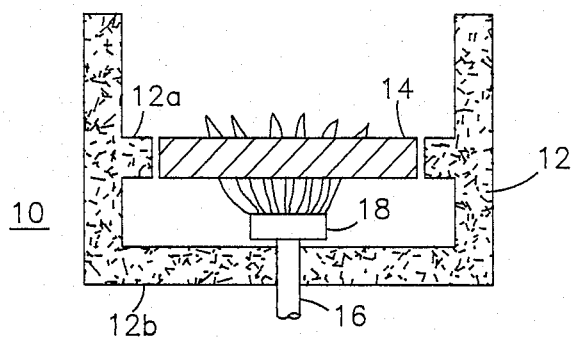
FIG. 1
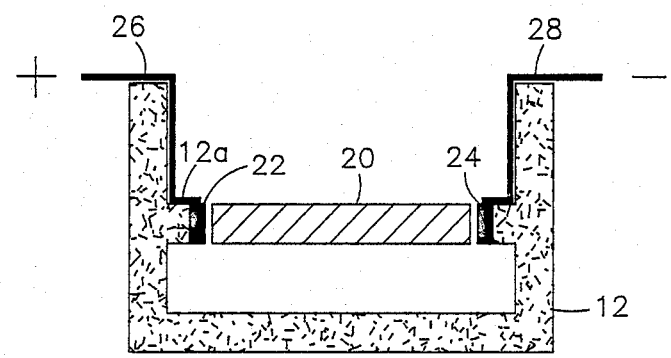
FIG. 2
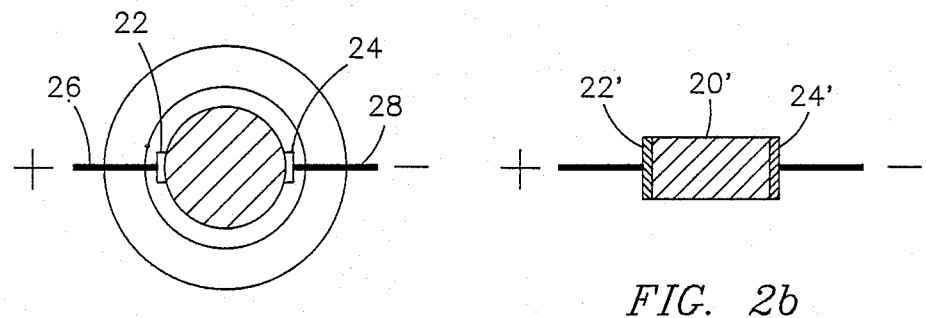
FIG. 2a
FIG. 2b

FILTRATION ASSEMBLY HAVING INTEGRAL HEATING MEANS FOR MAINTAINING THE METALLIC MATERIAL BEING FILTERED IN THE MOLTEN STATE

FIELD OF THE INVENTION

The present invention relates to filters for filtering metallic material and more particularly to a novel filter assembly having combined heating and filtering means which is especially advantageous for use in filtering impurities from metallic materials.

BACKGROUND OF THE INVENTION

The present invention is directed to a new method and apparatus for pre-heating the media employed for filtration of molten metals. It is necessary to pre-heat such media in order to prevent freezing of the molten metal filtrate upon initiation of the filtration process. A considerable amount of sensible heat is required when employing the present day filtration apparatus since most commercially available media have a high heat capacity. It is also particularly important to obtain maximum temperature uniformity during the pre-heating operation since local over-heating of the media significantly degrades the filtration operation and may also damage the media.

The traditional method employed for pre-heating molten metal filter media is by direct use of a gas flame which directly impinges upon the media. In one arrangement, a burner utilizing a mixture of air/natural gas is temporarily and removably placed near the bottom of a fixture employed to contain the reticulated or extruded monolithic ceramic media. The air/gas mixture emitted by the burner is ignited to produce a flame which impinges upon the underside of the media. Pre-heating continues for a prescribed period of time, or until some minimum media surface temperature is reached. At that time, the flame is extinguished, the burner is removed and metal flow through the media is initiated. The flow through the filter media must begin quickly after removal of the burner from the fixture to avoid need for repeating the pre-heat process due to cooling of the media.

Various gas-fired and electrical resistance heated hot air blowers have been used as an alternative to pre-heating the media by direct flame impingement. The expected benefits of the latter approach is to provide greater temperature uniformity and avoid local over-heating of the filter media. However, the limitations of excessive pre-heat time and low attainable temperature severely restricts the use of the forced hot air techniques.

In addition, all of the aforementioned preheat methods require direct access to the filter media and are not amenable to isolated filtration processes such as those which may be employed in a vacuum furnace.

BRIEF DESCRIPTION OF THE INVENTION

The present invention overcomes the disadvantages of the prior art techniques by providing method and apparatus which is characterized by providing heat generation by direct resistance (Joule), electrical heating or induction heating of the filter media to obtain the desired pre-heating. In order to practice the direct resistance technique, the filter media is rendered electrically conductive by either:

1. depositing or coating the media surface with a suitable conductive material;
2. including an electrically conductive material in the ceramic slurry comprising the media.

In order to practice the induction heating method, the filter media is rendered capable of being inductively heated by including either:

1. a magnetically susceptible material in the ceramic slurry comprising the media; or
2. inductively heating a silicon carbide media.

In the direct resistance method, the media surface ma preferably be coated with a fugitive electrically conductive material. Suitable coating methods include electroless or electrolytic plating, vapor deposition, and vacuum impregnation. The resulting coating is preferably uniform and sufficient in thickness to provide the appropriate level of heat generation.

The second case under the direct resistance method involves the inclusion of electrical conductive or susceptible particles in the filter construction itself. Acceptable materials comprising the particles included iron, tungsten, nickel, silicon carbide as well as other suitable materials.

Finally, the entire filter media may be constituted from a susceptible material such as silicon carbide.

Once a suitable media has been produced, heating can be accomplished by either direct resistance or induction. In the former case, the filter media holding fixture is provided with electrodes that contact the perimeter of the media. A current of suitable magnitude is then passed directly through the filter media to produce heating due to the $I^2R$ losses.

Employing the induction pre-heating method, an inductor coil is incorporated in the media holding fixture and is activated by a suitable power supply to inductively pre-heat the media.

The pre-heat apparatus and method of the present invention provides distinct advantages over the state-of-the-art methods which include, among others, highly uniform pre-heating of the media; the capability of maintaining pre-heat temperatures for extended periods without over-heating; predictable and reproducible media pre-heat levels and the capability of providing pre-heating in an isolated media, such as a vacuum furnace.

OBJECTS OF THE INVENTION AND BRIEF DESCRIPTION OF THE FIGURES

It is therefore one object of the present invention to provide a media for filtering molten metallic materials in which the heating means forms an integral part of the filtration media.

Still another object of the present invention is to provide a novel media for filtering molten metallic materials in which the pre-heating of the media is accomplished by direct resistance electrical heating.

Still another object of the present invention is to provide a novel media for filtering molten metallic materials in which the pre-heating of the media is accomplished by inductive heating of the filter media.

Still another object of the present invention is to provide a novel filter media of the type described in which suitable materials are incorporated into the filter media to achieve either direct resistance electrical heating or heating by induction.

Still another object of the present invention is to provide a novel filter media of the character described herein in which the filter media is capable of being heated by induction.

The above, as well as other objects of the invention, will become apparent when reading the accompanying description and drawings in which:

FIG. 1 shows a prior art technique for pre-heating a filter media.

FIG. 2 shows the novel filter media of the present invention and apparatus for pre-heating same.

FIGS. 2a and 2b show plan views of alternative arrangements for the media of FIG. 2.

DETAILED DESCRIPTION OF THE INVENTION AND PREFERRED EMBODIMENTS THEREOF

Figure 3:
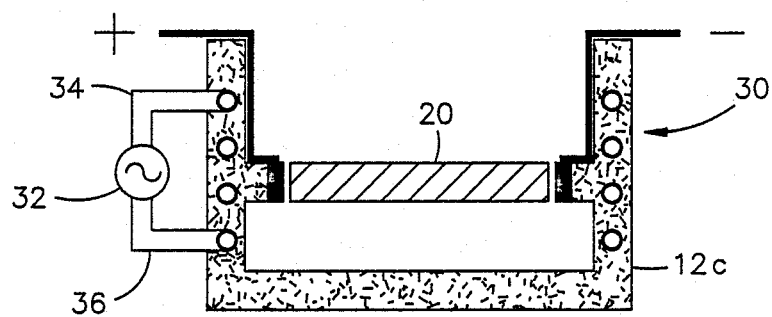
FIG. 3 shows an alternative embodiment of the present invention which may be used in place of the apparatus shown in FIG. 2.

FIG. 1 shows the conventional apparatus 10 employed in the prior art for pre-heating a filter media.

Apparatus 10 is comprised of a tundish basin 12 which may, for example, be of a substantially cylindrical shape and having an inwardly directed annular flange 12a for positioning and supporting disk-shaped filter media 14. A conduit 16 coupled to a source of natural gas extends through the base 12b of basin 12 for coupling to burner 18. An air/natural gas mixture is emitted by burner 18. This mixture is ignited causing the flame developed thereby to heat filter 14. In order to be assured that the entire volume of the filter is heated, two or more burners 18 may be provided. Nevertheless, and whether one or more burners are employed, it is extremely difficult to obtain uniform heating of filter 14. In addition, when using a plurality of burners, the time required to remove all of the burners subjects the media to undue cooling, thus degrading the filtration operation.

When filter 14 is elevated to the desired temperature, the flow of natural gas to conduit 16 is terminated, filter 14 is temporarily removed, burner 18 is removed from basin 12 and filter 14 is replaced to initiate the filtration process. All of the above operations must be performed as quickly as possible in order to be assured that filter 14 is maintained at the desired pre-heat level and thereby to avoid the necessity for repeating the pre-heat operation, thus making the conventional technique a rather tedious and cumbersome undertaking.

FIG. 2 shows one preferred embodiment of the present invention in which tundish basin 12 is fitted with a filter media 20 designed in accordance with the principles of the present invention. In addition, the basin is provided with a pair of electrodes 22 and 24 which are respectively connected to positive and negative terminals of a power source (not shown) by conductive leads 26 and 28, respectively.

Pre-heating of filter 20 takes place by coupling electrical energy to electrodes 22 and 24 causing a current to flow through the electrical material which forms an integral part of filter media 24. The $I^2R$ losses developed by the conductive material serves to heat the filter media in a substantially uniform manner.

In order to provide more uniform heat through the filter media, the filter media may be placed in a tundish having a substantially rectangular shaped supporting flange and wherein the filter media 20' shown in FIG. 2b is provided with elongated electrodes 22', 24' extending the entire length of the short sides of filter 20'. Other techniques may be employed, such as providing a heavier concentration of conductive material in those regions displaced from the center region of the circular shaped filter media 20 shown in FIG. 2a to render the current flow and hence the heating of the entire filter media more uniform.

In the embodiment shown in FIG. 3, the filter 20 is either formed of a ceramic slurry containing a magnetically susceptible material or the media may be formed of silicon carbide. An induction coil 30 may be embedded in or surround the external wall 12c of basin 12. Opposite ends of the inductive coil are connected to a suitable A/C current source 32 by conductive leads 34, 36. In the embodiment shown in FIG. 3, filter 20 is pre-heated by applying electrical energy in the form of an alternating current to induction coil 30. The induction coil sets up an alternating magnetic field which induces a current in the magnetically susceptible material in filter 20 to heat the material (or the silicon carbide) to the desired pre-heating level. The techniques employed in the arrangement shown in FIGS. 2 and 3 provide for uniform heating of the media and further do not require removal of the source of the pre-heat, as is the case with the prior art techniques shown in FIG. 1.

The preferred mode of the present invention is believed to be the pre-heating of the filter media by direct electrical resistance heating.

Figure 4:
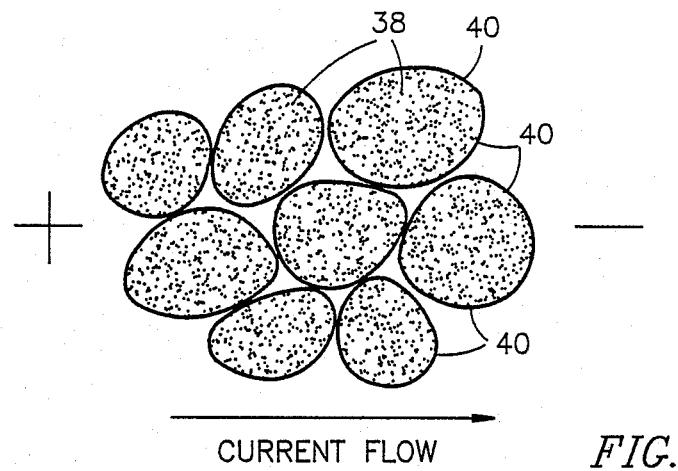
FIGS. 4 and 5 show detailed views of the filter media which may be employed in the apparatus of FIG. 2.

FIG. 4 shows a detailed view of a portion of the filter which may be employed in the embodiment of FIG. 2 which is comprised of reticulated foam substrate granules 38 each having an electrically conductive coating 40. The reticulated or extruded monolithic ceramic media may, for example, be coated with nickel by electroless or vapor deposition means to achieve a coating thickness of the order of 0.22 inches. Electrodes are incorporated into the sealing surfaces of the media holding fixture 12a in order to establish electrical contact between the electrodes 22, 24 and the media.

An electrical current in the range of from 5 to 100 amperes per cubic inch of media at a potential voltage of from 6 to 70 volts is passed through the media. When the desired pre-heat temperature is attained, the current flow is terminated and metal flow through the media is initiated.

Figure 5:
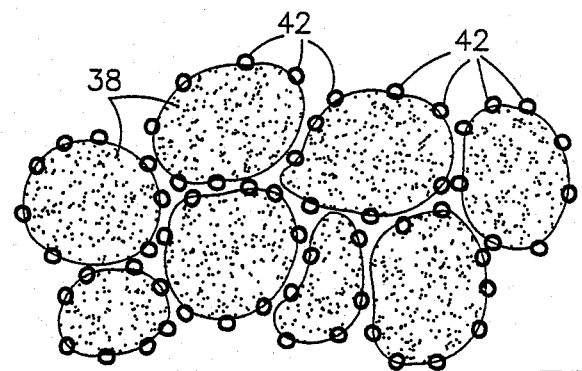

In the embodiment of FIG. 5, electrically conductive or magnetically susceptible material, in particulate form is introduced into the ceramic slurry comprising the media to provide conductive particles 42 upon the surfaces of the reticulated foam substrate granules 38. The resulting filter media is electrically coupled to the electrodes in a manner similar to that described hereinabove in connection with the embodiments of FIGS. 1 and 4.

Alternatively, in the case where the particles 42 introduced into the slurry are magnetically susceptible, the filter media is introduced into the apparatus of FIG. 3 to provide heating of the filter media by induction through coil 30.

Figure 6:
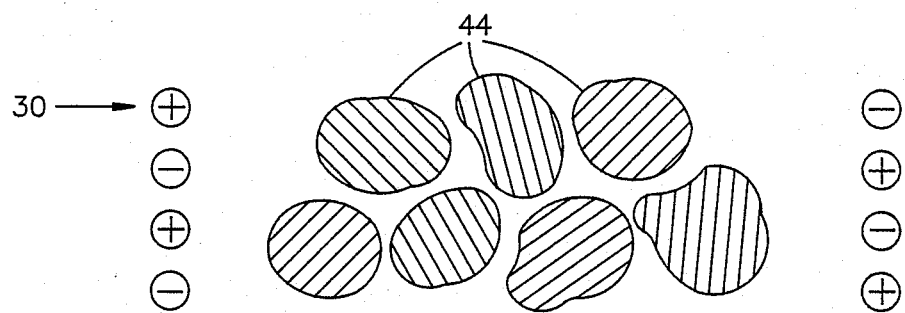
FIG. 6 shows a detailed view of a filter media which may be employed in the apparatus of FIG. 3.

FIG. 6 shows a detailed view of a filter media comprised of silicon carbide granules 44.

A filter media of the type shown in FIG. 6 is arranged within the apparatus of FIG. 3 and the filter is pre-heated by induction through the use of an induction coil 30 as shown in FIG. 3 and 6. The particles of the filter media are retained in a bonded state, through the employment of any suitable bonding material.

The filter method and apparatus of the present invention provides a vastly improved filter structure for the reasons that media pre-heating is highly uniform, the media can be maintained at pre-heating temperatures for extended periods without over-heating; the media pre-heating level is predictable reproducible and pre-heating can be accomplished for isolated media for example, of the type employed in a vacuum furnace.

A latitude of modification, change and substitution is intended in the foregoing disclosure, and in some instances, some features of the invention will be employed without a corresponding use of other features. Accordingly, it is appropriate that the appended claims be construed broadly and in a manner consistent with the spirit and scope of the invention here.

What is claimed is:

1. A filter apparatus for heating the filter media suitable for the filtration of molten metallic material delivered to the filter apparatus in the molten state and for maintaining the metallic material in the molten stage during filtration thereof, said filter structure being comprised of:
    a filter media in granulated form;
    said filter media having a conductive material deposited thereon;
    a pair of electrical contacts being coupled to the perimeter of said filter media for coupling electrical energy from a power source to said filter, said power source being sufficient to develop a current in said conductive material, said current being of a magnitude sufficient to develop $I^2R$ heat loss to achieve the desired pre-heating level preparatory to initiation of flow of the molten metallic material delivered to said apparatus for passage and filtration through said filter media.

2. The apparatus of claim 1 wherein the conductive material is comprised of a conductive coating of a predetermined thickness provided on said filter media.

3. The apparatus of claim 2 wherein said conductive coating is comprised of nickel.

4. The apparatus of claim 1 wherein said filter is arranged within a supporting structure having sealing means of sealing the interface between the supporting structure and the perimeter of said filter media;
    said electrodes being incorporated into said sealing means to provide suitable electrical contact between said electrodes and said filter media.

5. The apparatus of claim 1 wherein the conductive material is distributed through the filter media in such a manner as to provide uniform heating of the media.

6. The apparatus of claim 5 wherein the conductive material is distributed throughout the media in a non-uniform manner to obtain uniform current.

7. Filter apparatus for use in filtering molten metallic media comprising:
    a filter media incorporating magnetically susceptible material;
    a supporting structure for supporting said filter media;
    induction means surrounding said filter media for heating said filter media by induction upon energization of said induction means for pre-heating the filter media to a level sufficient to assure appropriate filtration of the molten material.

8. The apparatus of claim 7 wherein said induction means comprises an induction coil surrounding said supporting structure.

9. The apparatus of claim 8 wherein said induction means comprises an induction coil imbedded within said filter media supporting means.

10. The apparatus of claim 7 wherein said filter media is comprised of granules of silicon carbide.

11. A filter apparatus for heating the filter media suitable for the filtration of molten metallic material delivered to the filter media in the molten state, said filter structure being comprised of:
    a filter media preferably in granulated form;
    the granules of said filter media having a conductive material admixed therewith;
    a pair of electrical contacts being coupled to the perimeter of said filter media for coupling electrical energy to said filter to develop a current in said conductive material, said current being of a magnitude sufficient to develop $I^2R$ heat loss to achieve the desired pre-heating level preparatory to initiation of flow of the molten metallic material passed through said filter media.

12. A method for pre-heating a filter media employed for filtration of molten metallic material delivered to the filter media in the molten state comprising the steps of:
    providing a filter media comprised a granules having a conductive material deposited thereon;
    supporting said filter media within a supporting structure;
    providing a pair of electrodes electrically coupled to said filter media;
    coupling an electrical energy source to said electrode to heat said filter media by induction, said energy source providing energy of a level sufficient to heat the filter media to a temperature capable of maintaining the molten metallic material in the molten state for achieving proper filtration of the molten material.

* * * * *

UNITED STATES PATENT AND TRADEMARK OFFICE
CERTIFICATE OF CORRECTION

PATENT NO. : 4,834,876

DATED : May 30, 1989

INVENTOR(S) : Nicholas G. Walker

It is certified that error appears in the above-identified patent and that said Letters Patent is hereby corrected as shown below:

At Column 2, line 11, "ma" should be --may--

At Column 4, line 38, "0.22" should be --0.02--

At Column 5, line 6, after "predictable" insert --and--

At Column 5, line 21, "stage" should be --state--

Signed and Sealed this

Fifth Day of March, 1991

Attest:

HARRY F. MANBECK, JR.

Attesting Officer

Commissioner of Patents and Trademarks